United States Patent [19]

Brown et al.

[11] Patent Number: 4,665,938

[45] Date of Patent: May 19, 1987

[54] FREQUENCY FEEDBACK ON A CURRENT LOOP OF A CURRENT-TO-PRESSURE CONVERTER

[75] Inventors: Gregory C. Brown, Minnetonka; Gerald R. Cucci, Minneapolis, both of Minn.

[73] Assignee: Rosemount Inc., Eden Prairie, Minn.

[21] Appl. No.: 913,767

[22] Filed: Sep. 30, 1986

[51] Int. Cl.$^4$ ............................................. G05D 16/00
[52] U.S. Cl. ........................................ 137/85; 137/84; 137/486; 137/487.5
[58] Field of Search ................. 137/82, 85, 86, 486, 137/487.5; 251/129.04, 129.06

[56] References Cited

U.S. PATENT DOCUMENTS

| | | | |
|---|---|---|---|
| 4,325,399 | 4/1982 | Frick | 137/487.5 X |
| 4,403,297 | 9/1983 | Tivy | 364/579 |
| 4,481,967 | 11/1984 | Frick | 137/85 |
| 4,492,246 | 1/1985 | Prescott | 251/129.04 X |
| 4,520,359 | 5/1985 | Kitagawa et al. | 340/870.19 |
| 4,527,583 | 7/1985 | Simpson | 137/82 |

FOREIGN PATENT DOCUMENTS 2065331 3/1979 United Kingdom .

*Primary Examiner*—Alan Cohan
*Attorney, Agent, or Firm*—Kinney & Lange

[57] ABSTRACT

A current-to-pressure (I/P) converter provides an output pressure as a function of the magnitude of a variable input DC current. The I/P converter includes a pressure sensor which produces a feedback signal representative of the output pressure. Based upon the feedback signal and the magnitude of the input DC current, an electrical control signal is produced which controls a device for varying the output pressure. The I/P converter also includes a circuit for generating a time-varying signal which is sent back over the current loop wires through which the input DC current flows. The time-varying signal provides an indication of whether the I/P converter is functioning properly. This permits diagnosis of possible causes of control system malfunctions without having to inspect the I/P converter itself.

12 Claims, 4 Drawing Figures

FREQUENCY FEEDBACK ON A CURRENT LOOP OF A CURRENT-TO-PRESSURE CONVERTER

BACKGROUND OF THE INVENTION

1. Field of the Invention

The present invention relates to current-to-pressure (I/P) converters.

2. Description of the Prior Art

Various electro-pneumatic transducers which convert an electrical signal to a pressure signal for controlling valves and the like have been used in the prior art. Typically, these devices have used some form of mechanical feedback to stabilize the transducer at an output pressure commanded by the electrical signal.

Recently, a new type of I/P transducer or converter has been developed which operates based upon current flowing through a two-wire current loop and which uses electrical feedback signals representative of the output pressure along with the magnitude of the input current to control a transducer which varies the output pressure. This type of I/P converter is described in U.S. Pat. No. 4,481,967 by Roger L. Frick, which is assigned to the same assignee as the present application. Other examples of this new type of I/P converter are shown in the Prescott et al U.S. Pat. No. 4,492,246, the Simpson U.S. Pat. No. 4,527,583, and in U.K. patent application 2065331.

Typically, both the mechanical type electro-pneumatic converter as well as the newer electronic I/P converter are intended to be used in a process control environment where, in many cases, access to the I/P converter or the valve which it controls is difficult and time-consuming. When a malfunction or loss of operation occurs, there are a number of possible sources of the problem, only some of which involve the I/P converter. Among the causes of failure can be loss of input pressure, a restriction in the input line to the I/P converter, a stuck or contaminated valve, a plugged filter in the pneumatic line, improper pressure regulator settings, improper calibration of the I/P converter, or malfunction of the I/P converter. The ability to diagnose the cause of a system failure and to determine whether or not the I/P converter is the cause of that malfunction would be an extremely important improvement to the current state-of-the-art in I/P converters.

I/P converters are, in general, relatively low cost devices in comparison to, for example, a two-wire pressure transmitter which may be used in the same process control system. Improvements to I/P converters, therefore, most not involve significant increases in the cost of the I/P converter.

SUMMARY OF THE INVENTION

The I/P converter of the present invention provides an output pressure as a function of a magnitude of a variable input DC current. The converter includes means for providing an electrical feedback signal which is representative of the output pressure, and means for providing a control signal as a function of the magnitude of the input DC current and the feedback signal. The control signal is used to control the magnitude of the output pressure.

With the present invention, the I/P converter also includes means for transmitting, over a circuit through which the input DC current flows, a time-varying signal which has a characteristic which indicates whether the I/P converter is functioning as intended.

In a preferred embodiment, the time-varying signal is a function of the feedback signal, so that the time-varying signal provides an indication of the output pressure which the I/P converter has sensed. The time-varying signal preferably has a frequency which is a function of the feedback signal.

With the present invention, therefore, it is possible to monitor remotely the performance of the I/P converter. The desired pressure is known (because the desired pressure determines the magnitude of the input DC current supplied to the I/P converter), therefore the value of the pressure sensed by the I/P converter allows the operator or technician to evaluate whether the I/P converter is controlling output pressure. From this information, it is possible to diagnose, without actually going to the I/P converter, the probable cause of numerous types of problems with the process control system, which may or may not relate to the operation of the I/P converter itself.

DETAILED DESCRIPTION OF THE PREFERRED EMBODIMENTS

Figure 1:
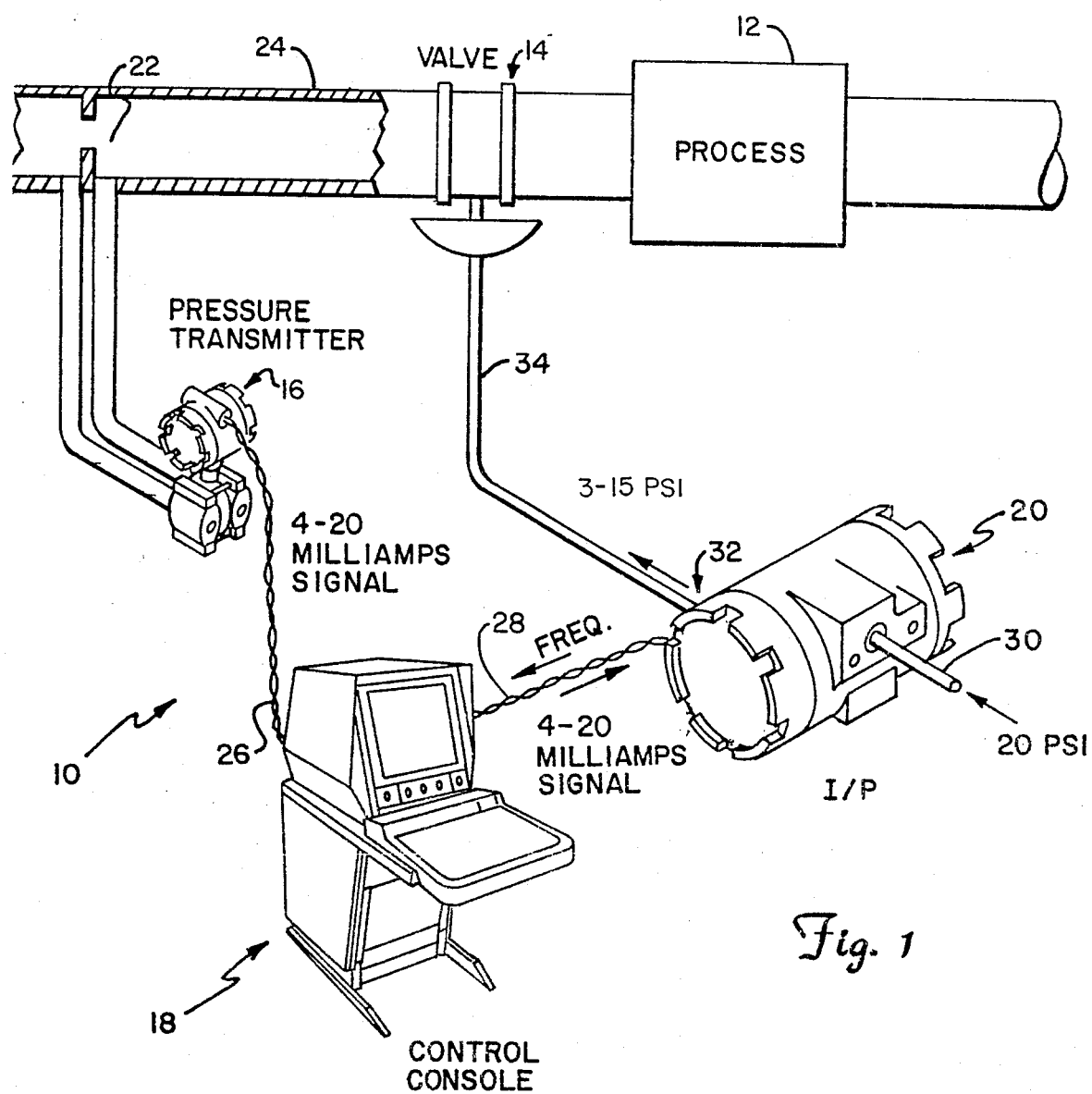
FIG. 1 is a schematic representation of a process control system which includes an I/P converter of the present invention.

Control system 10 shown in FIG. 1 is a closed loop control system used to control flow to a process 12 by controlling operation of a pneumatically actuated valve 14. Control system 10 includes two-wire pressure transmitter 16, control console 18, and two wire I/P converter 20.

Pressure transmitter 16 is, in the embodiment shown in FIG. 1, a differential pressure sensor which measures the pressure differential across orifice 22 in pipe 24. The differential pressure is representative of flow in pipe 24. Orifice 22 is located upstream of valve 14. Pressure transmitter 16 is connected to control console 18 by a two-wire current loop 26, which extends from control console 18 (which is located in a control room) to pressure transmitter 16, which is located on or very near pipe 22. Pressure transmitter 16 senses pressure, and varies the magnitude of the DC current flowing through two-wire current loop 26 over a range of, for example, 4 to 20 milliamps. Control console 18 includes a power source and a load which, together with pressure transmitter 16, complete the two-wire current loop circuit. By sensing the loop current, control console 18 monitors the pressure being sensed by pressure transmitter 16, and hence a signal representative of flow in pipe 24 is available at console 18.

Control console 18 is also connected by another two-wire current loop 28 to I/P converter 20. Control console 18 provides a variable magnitude input DC current through two-wire loop 28 which powers I/P converter 20 and also serves as a command signal for determining the output pressure from I/P converter 20. A supply pressure (which is, for example, 20 psi) is provided to inlet port 30 of I/P converter 20. Outlet port 32 of I/P converter 20 is connected by line 34 to valve 14. The output pressure from I/P converter 20 varies over a predetermined range (for example, from 3 to 15 psi) as a function of the magnitude of the loop current provided by control console 18 (which, for example, varies from 4 to 20 milliamps). The control system 10 of FIG. 1 is thus a closed loop control system controlling flow to the process 12.

I/P converter 20 is an electronic I/P converter of the type described in the previously mentioned Frick U.S. Pat. No. 4,481,967, which is included herein by reference. The output pressure of I/P converter 20 is sensed by a pressure sensor which produces an electrical pressure feedback signal to the control circuitry of I/P converter 20. This feedback signal (PRESSURE), together with a signal (SENSE) which represents the magnitude of the loop current from control console 18 are used to produce a control signal (ERROR) which drives an electromechanical device to vary the output pressure at port 32.

I/P converter 20 of the present invention also produces a time-varying signal which is superimposed onto the loop current flowing through two-wire loop 28. This time-varying signal provides a feedback to control console 18 which can be used for remote diagnosis of control system 10 from the control room where control console 18 is located. Using the time-varying signal received from I/P converter 20, the operator at control console 18 can make a determination of the probable cause of a system failure or malfunction without first having to go into a hazardous or inaccessible area of the plant to locate pressure transmitter 16, valve 14 and I/P converter 20. The time-varying signal provided on two-wire loop 28 by I/P converter 20 has, in a preferred embodiment, a frequency which is a function of the feedback signal (PRESSURE). Since the desired output pressure is known (control console 18 is providing the command to I/P converter 20), a comparison of the actual output pressure being sensed by the I/P converter 20 with the requested pressure represented by the magnitude of the loop current provides an indication of whether I/P converter 20 is operating as intended. The 4–20 mA signal on line 28 and the time varying diagnostic signal on line 28 have different signal characteristics so that the two signals do not substantially interfere with one another. In a preferred embodiment, the 4–20 mA signal is a low frequency signal and the diagnostic signal is a high frequency signal.

In other embodiments of the present invention, the time-varying signal 28 has separate portions, separated in time and/or frequency, which have frequencies which are a function of the PRESSURE signal, the SENSE signal and the ERROR signal. This provides further diagnostic information about the functioning of I/P converter 20.

Figure 2:
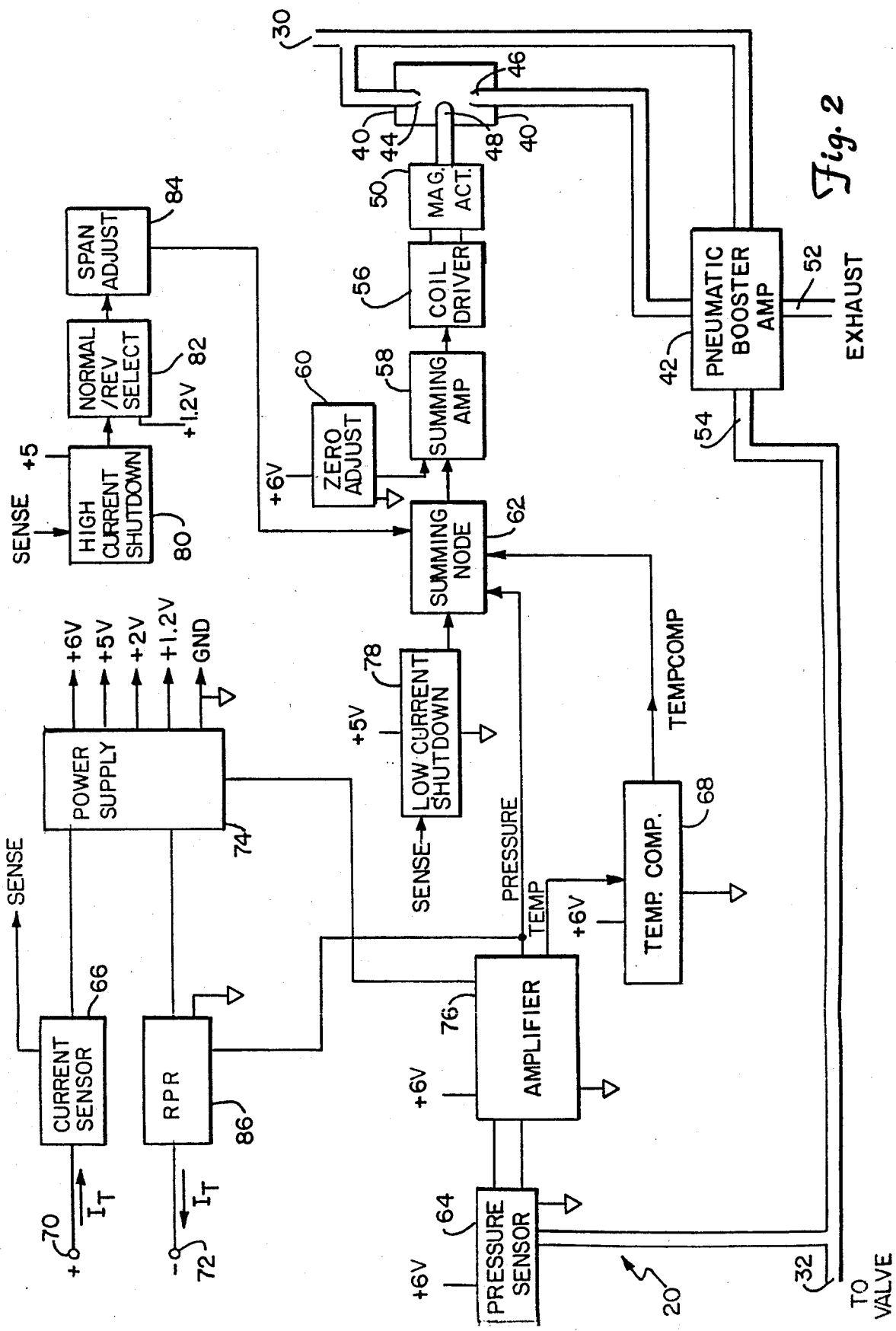
FIG. 2 is a block diagram of a preferred embodiment of the I/P converter of the present invention.

FIG. 2 shows a block diagram of one embodiment of the I/P converter 20 of the present invention. A pressurized fluid such as air received at the inlet port 30 of I/P converter 20 is supplied to electric-to-pneumatic transducer 40 and to pneumatic booster amplifier 42. In the embodiments shown in FIG. 2, electric-to-pneumatic tranducer 40 is of type described in U.S. Pat. No. 4,534,376 by G. C. Brown entitled "Electric Signal to Pressure Signal Transducer" and included herein by reference. Transducer 40 includes nozzle 44 which is connected to inlet port 30, receiver 46 which is connected to pneumatic booster amplifier 42, and movable deflector 48 which deflects air flow between nozzle 44 and receiver 46 depending on its position in the gas stream. That position is controlled by magnetic actuator 50.

Pneumatic booster amplifier 42 has an exhaust port 52 and has an outlet 54 which is connected to outlet port 32. The output pressure at outlet 32, as supplied by booster amplifier 42, is a function of the received pressure from electric-to-pneumatic converter 40.

Magnetic actuator 50 is driven by coil driver 56, which in turn is controlled by summing amplifier 58. The inputs to summing amplifier 58 include a zero adjust signal from zero adjust circuit 60 and a signal from summing node 62. The signal from summing node 62 is a function of the outlet pressure sensed by pressure sensor 64 and the magnitude of the loop current sensed by current sensor 66. The signal from summing node 62 is adjusted for temperature effects sensed by temperature compensation circuit 68.

The loop current $I_T$ from current loop 28 is received at plus (+) terminal 70 and flows into I/P converter 20 to provide all of the electrical power for I/P converter 20. Minus (−) terminal 72 is also connected to current loop 28. The current $I_T$ flows out of minus terminal 72 and through current loop 28 back to control console 18.

The incoming loop current $I_T$ is sensed by current sensor 66 to produce the SENSE signal. Loop current power supply 74 is connected to current sensor 66 to receive $I_T$, and produces all of the various operating voltages required by the remainder of the electrical circuitry of I/P converter 20.

Pressure sensor 64 senses the output pressure of I/P converter 20 at outlet port 32 and provides an electrical signal to amplifier 76 which is a function of the sensed pressure. Amplifier 76 produces the feedback signal (PRESSURE) which is supplied to summing node 62.

The SENSE signal is supplied to low current shut down circuit 78 and to high current shut down circuit 80. Low current shut down circuit 78 senses when the loop current falls below a selected level such as 3.3 mA, and provides an output signal to summing node 62 which reduces the output pressure of converter 20 when insufficient current is available from the loop 28 to insure proper operation of converter 20.

High current shut down circuit 80 provides an output which is representative of the loop current but only up to approximately 25 mA. Above this 25 mA level, the output of high current shut down circuit 80 limits the amount of output pressure which can be provided, and thus provides an important protection against loop current malfunction to valve actuators and other sensitive devices controlled by the output pressure.

The output of high current shut down circuit 80 is supplied to normal/reverse select circuit 82, which determines the direction in which the outlet pressure of converter 20 will change with a change in command current $I_T$. In normal operation, an increase in the magnitude of $I_T$ results in an increase in outlet pressure. In the reverse condition, an increase in the magnitude of $I_T$ results in a decrease in outlet pressure.

The output of normal/reverse select circuit is supplied to span adjust circuit 84. The output of span adjust circuit 84 is supplied to summing node 62.

Span adjustment circuit 84 provides an adjustment of the rate of pressure change per current change for converter 20. The output signal from span adjustment circuit 84 is representative of sensed current $I_T$ but is adjusted for span, adjusted for polarity to provide normal or reverse selection, and is limited by the high current shut down circuit 80 to prevent damage to a valve or other device connected to outlet port 32.

In a preferred embodiment, pressure sensor 68 is a piezoresistive strain gauge pressure sensor or a capacitive pressure sensor. The low level signal from pressure sensor 64 is coupled to amplifier 76, which amplifies the signal and provides a higher level signal (PRESSURE) which is representative of the sensed output pressure.

Amplifier circuit 76 also provides a signal (TEMP) which is representative of temperature. The TEMP signal is coupled to temperature compensation circuit 68, which in turn couples a current (TEMP COMP) representative of temperature to the summing node.

The signals (in the form of currents) from span adjustment circuit 84, low current shut down circuit 78, temperature compensation circuit 68, and amplifier 76 are all coupled into summing node 62 to generate a potential which is representative of the temperature corrected difference between the desired pressure (as represented by the loop current $I_T$) and the actual pressure (as represented by the output pressure sensed by pressure sensor 64).

The potential at summing node 62 is coupled to summing amplifier 58. The zero adjustment circuit 60 also couples a zero adjustment signal to summing amplifier 58, and the output of summing amp 58 is provided to coil driver 56 to control the level of current in the actuator coil of magnetic actuator 50.

I/P converter 20 also provides a time varying signal which is superimposed on the loop current $I_T$ and flows through current loop 28 back to control console 18. The time varying signal has a frequency which, in the embodiment shown in FIG. 2, is representative of the sensed output pressure.

Amplifier 76 provides the PRESSURE signal to remote pressure readout (RPR) circuit 86. The PRESSURE signal is a voltage proportional to the output pressure sensed by pressure sensor 64. RPR circuit 86 converts the PRESSURE signal to a variable frequency signal which is superimposed on the loop current $I_T$ and is supplied out through terminal 72 back to control console 18 over two wire loop 28. In a preferred embodiment of the present invention, the RPR output signal has a voltage of about 700 mV peak-to-peak at room temperature and a frequency which varies from 5300 Hertz representing a 3 psi output pressure to 6500 Hertz representing a 15 psi output pressure. In this particular embodiment, the range of output pressures is 3 to 15 psi which varies linearly based upon the magnitude of the loop current $I_T$ where a value of $I_T=4$ mA corresponds to a desired output pressure of 3 psi, and $I_T=20$ mA corresponds to a desired output pressure of 15 psi. In this embodiment, the sensed output pressure (in psi) can be derived from the frequency of the RPR signal at control console 18 by determining the frequency of the RPR signal, subtracting 5000 and dividing by 100.

The 4–20 milliampere signal on two-wire loop 28 is a low frequency controlled current signal with signal components ranging from a steady or DC level up to 100 Hz or less. The remote pressure readout (RPR) signal superimposed on the loop is selected to be a low amplitude potential signal having signal components that are separated in frequency from the signal components of the 4–20 milliampere signal. In the embodiment shown, the RPR signal components have frequencies that are more than 50 times the frequencies of the 4–20 milliampere signal to provide a preferred wide frequency separation which minimizes interference between the two signals. In control console 18, the 4–20 MA signal and the RPR signal can be separated with simple filters comprising resistors and capacitors. Alternatively, the RPR signal can be sensed by simply connecting a capacitively coupled frequency counter to the loop 28.

Figure 3:
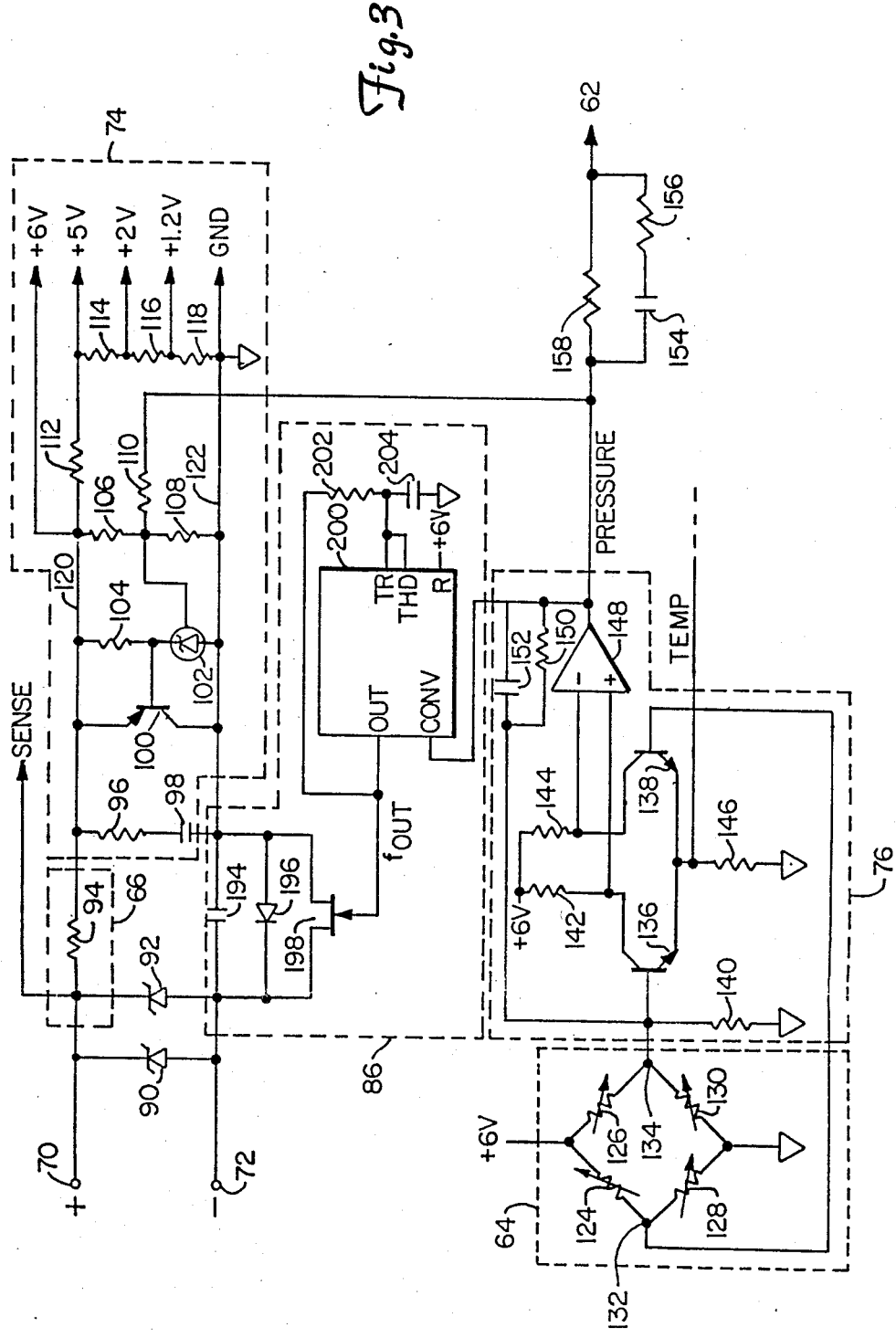
FIG. 3 is an electrical schematic diagram of a portion of the I/P converter of FIG. 2.

FIG. 3 is an electrical schematic diagram of a portion of the circuitry of I/P converter 20 which provides the remote pressure readout (RPR) shown in block diagram form in FIG. 2. FIG. 3 shows terminal 70 and 72, current sensor 66, power supply 74, pressure sensor 64, amplifier 76, and RPR circuit 86.

Connected between terminals 70 and 72, as shown in FIG. 3, are a pair of zener diodes 90 and 92 which protect converter 20 from damage due to excessive loop voltage. Current sensor 66 comprises a current sensing resistor 94 which is connected between terminal 70 and power supply circuit 74. The SENSE signal is derived from the more positive side of resistor 94, i.e. from terminal 70.

Power supply circuit 74 includes a filter formed by resistor 96 and capacitor 98, a regulating transistor 100, adjustable reference diode 102, and resistors 104, 106, 108, 110, 112, 114, 116 and 118. The filter formed by resistor 96 and capacitor 98 bypasses high frequency signals (such as the RPR signal) so that the circuit 74 is not disturbed by such high frequency signals. Power supply 74 is energized by the loop and produces a regulated voltage of +6 volts between conductor 120 and conductor 122, and divides that +6 volt potential down to produce other voltages used by converter 20, including +5 volts, +2 volts, and +1.2 volts. Conductor 122 is considered to be "ground" as a reference for all of these voltages.

Pressure sensor 64 is, in the preferred embodiment shown in FIG. 3, a piezoresistive strain sensor having four variable resistors 124, 126, 128, and 130 connected in a bridge. Alternatively, capacitive pressure sensing may be used in place of strain gauge sensing. As the output pressure varies, the resistances of resistors 124, 126, 128 and 130 vary, causing the change in the balance of the bridge.

Output terminals 132 and 134 of the bridge are connected to the inputs of a differential amplifier stage of amplifier 76. The differential amplifier stage includes NPN transistors 136 and 138, and resistors 140, 142, 144, and 146. The outputs of the differential amplifier stage are provided to the inputs of op amp 148, which produces an output signal voltage (PRESSURE) which is representative of the output pressure sensed by pressure sensor 64. The output of amplifier 148 is also fed back through resistor 150 and capacitor 152 to the base of transistor 136.

The PRESSURE signal is filtered and converted to a current by capacitor 154 and resistors 156 and 158. The PRESSURE current is then supplied to summing node 62.

Amplifier circuit 76 also produces a temperature signal (TEMP) which is derived from the emitters of transistors 136 and 138. The TEMP signal is supplied to temperature compensation circuit 68 shown in FIG. 2.

RPR circuit 86 which is shown in FIG. 3 receives the PRESSURE signal voltage from the output of op amp 148. RPR circuit 86 includes capacitor 194, diode 196, and FET 198 which are connected in parallel with one another between ground conductor 122 and terminal 72. A voltage controlled oscillator (VCO) formed by an integrated circuit 555 timer 200, resistor 202, and capacitor 204 converts the PRESSURE signal voltage at the output of op amp 148 to a frequency which is proportional to output pressure. This frequency signal $f_{OUT}$ is supplied to the gate of FET 198. As a result, FET 198 turns on and off, thus periodically shorting out diode 196. This develops a signal voltage of approximately 700 mV peak-to-peak at room temperature at the frequency $f_{OUT}$ which is superimposed on the two wire loop current. Capacitor 194 is connected in parallel with diode 196 to act as an energy storage device which prevents abrupt transients which would otherwise disrupt operation of power supply circuit 74. Capacitor 194 thus serves a filtering function and helps to separate the RPR signal from the loop current in the transmitter.

Figure 4:
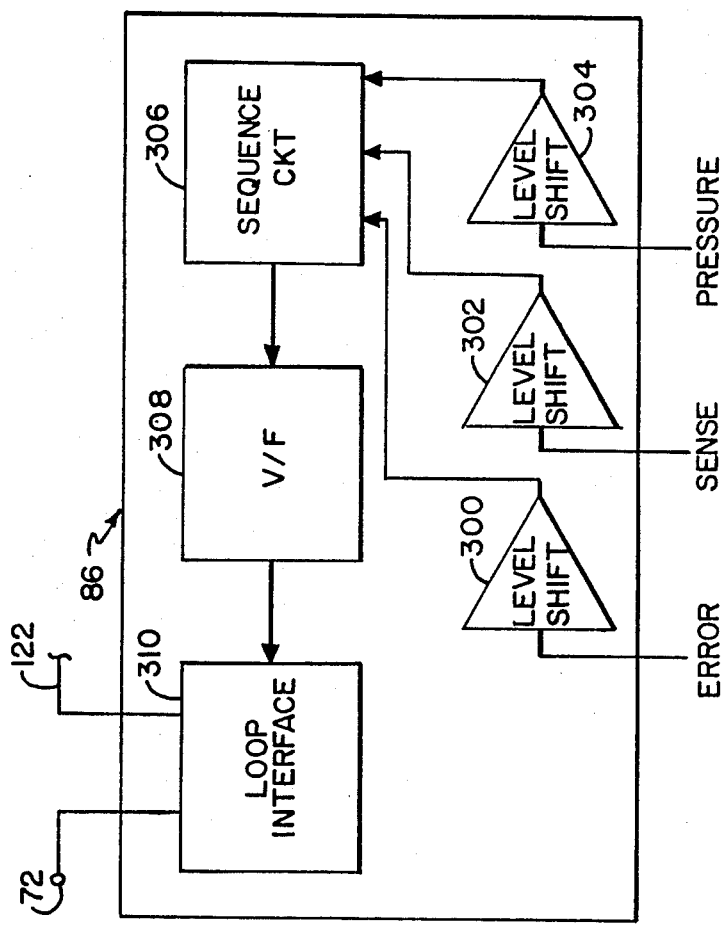
FIG. 4 is a block diagram of a portion of the I/P converter illustrating another preferred embodiment of the present invention.

In the embodiments shown in FIGS. 2 and 3, the RPR signal has a frequency $F_{out}$ which is a function of the sensed pressure. It is, however, possible to use other signals from I/P converter 20 either instead of or in addition to the sensed pressure to provide diagnostic information over loop 28. FIG. 4 shows another embodiment of the present invention in which the RPR signal is based upon three signals: PRESSURE, SENSE, and ERROR (which is the output of summing amplifier 58). In this embodiment, RPR circuit 86 includes level shifting circuits 300, 302, and 304, sequence circuit 306, voltage-to-frequency (V/F) converter 308, and loop interface circuit 310. Level shifting circuits 300, 302, and 304 provide different signal levels or offsets to each of the three signals, ERROR, SENSE, and PRESSURE, so that the frequency components of the RPR signal due to these three input signals can be distinguished from one another. The outputs of level shift circuits 300, 302, and 304 are supplied to sequence circuit 306, which sequentially supplies each of the three offset signals to V/F converter 308. The result is a frequency signal used to drive loop interface 310 which has a first frequency during a first time period, a second frequency during a second time period, and a third frequency during a third time period. During each of these time periods, one of the three input signals to RPR circuit 86 is being supplied by sequence circuit 306 to V/F converter 308. Loop interface 310 is preferably a switching circuit like the one formed by capacitor 194, diode 196, and FET 198 in FIG. 3.

The duration of the time periods and the order in which signals are provided by RPR circuit 86 is not critical so long as the order and durations are known. All that is required is that the three signals can be separated at control console 18 so that they can be used for diagnostic purposes.

With the present invention, trouble shoooting can be performed in the control room, before having to send service personnel out into the plant to try to locate the cause of a malfunction. Table 1 shows a trouble shooting matrix which can be performed in the control room when it is discovered that a control loop is not working properly. This matrix is based upon receiving an RPR signal which has a frequency representative of the sensed output pressure at I/P converter 20.

TABLE 1

| I/P Pressure | Control Indication | Indicated Problem |
|---|---|---|
| A. Tracks Input | OK | Stuck or Inoperative Valve |
| B. Pressure Stuck | No | Bad I/P Module |

TABLE 1-continued

| I/P Pressure | Control Indication | Indicated Problem |
|---|---|---|
| C. High Pressure O | No | No pneumatic supply pressure. Check for plugged lines or regulation. Lastly, check for plugged or frozen I/P. |
| D. I/P Pressure Tracks Input for Lower Part of Range | Part of Range OK | Bad regulator setting or bad regulator; low pneumatic supply. |
| E. I/P Pressure Tracks Input for Upper Part of Range | Part of Range OK | 1. Recalibrate I/P or 2. Replace I/P module |
| F. I/P Pressure shows sluggish response with step input | Unusable | 1. Dirty filter/reg. or 2. Plugged I/P-replace module 3. Units are frozen. |
| G. I/P Pressure is offset | No | 1. I/P needs recalibration 2. Replace module (check for circuit board corrosion: if present replace seal) |
| H. Loop is unstable Do F if OK | No | Defective I/P module or controller |
| I. No RPR signal on line but $I_T =$ 4–20 mA is present (2 wire continuity) | — | Bad I/P module |

As can be seen from Table 1, many of the causes for malfunction are not necessarily the I/P converter. Before going out into the plant, the maintenance personnel can be given a definite idea of what the cause of the malfunction is and what components of the control loop must be looked at first. As a result, substantial savings in time and expense can be achieved.

The substantial benefits of the I/P converter of the present invention are achieved without a significant increase in the cost of the device. As illustrated in the preferred embodiments, only a small amount of low cost circuitry is needed to add significant new features which greatly enhance the value and serviceability of the I/P converter.

Although the present invention has been described with reference to preferred embodiments, workers skilled in the art will recognize that changes may be made in form and detail without departing from the spirit and scope of the invention.

What is claimed is:

1. A current-to-pressure converter for providing an output pressure as a function of magnitude of a variable input DC current, the converter comprising:
   means for connecting the converter to a circuit through which the input DC current flows;
   means for providing a feedback signal representative of the output pressure;
   means for providing a control signal as a function of the magnitude of the input DC current and the feedback signal;
   means for providing the output pressure as a function of the control signal; and
   means for transmitting, over the circuit through which the input DC current flows, a time varying signal having a characteristic which indicates whether the converter is functioning properly.

2. The converter of claim 1 wherein the means for transmitting is responsive to the feedback signal to produce the time varying signal with a characteristic which is a function of the feedback signal.

3. The converter of claim 2 wherein the means for transmitting produces the time varying signal with a frequency which varies as a function of the feedback signal.

4. The converter of claim 1 wherein the means for transmitting is responsive to a signal representative of magnitude of the input DC current to produce the time varyiing signal with a characteristic which is a function of the magnitude of the input DC current.

5. The converter of claim 1 wherein the means for transmitting is responsive to the control signal to produce the time varying signal with a characteristic which is a function of the control signal.

6. The converter of claim 1 wherein the means for transmitting is responsive to plurality signals and produces the time varying signal with different portions representative of each of the plurality of signals.

7. The converter of claim 6 wherein the plurality of signals include the feedback signal.

8. The converter of claim 7 wherein the plurality of signals include a signal representative of the magnitude of the input DC current.

9. The converter of claim 8 wherein the plurality of signals include the control signal.

10. The converter of claim 6 wherein the different portions produced by the means for transmitting are separated in time.

11. The converter of claim 6 wherein the different portions produced by the means for transmitting are separated in frequency.

12. An electrical control apparatus for providing an output fluid pressure at an output which is a function of a magnitude of a variable input DC current, the apparatus comprising:

first and second terminals adapted to be connected in a circuit through which the variable input DC current flows, and wherein the control apparatus is energized solely by the variable input DC current flowing between the first and second terminals;

first and second conductors connected to the first and second terminals, respectively;

first circuit means for receiving the input DC current and providing an electrical signal representative of the magnitude of the input DC current;

pressure sensor means for receiving the output pressure and providing an electrical signal representative of the output pressure;

amplifier means for receiving the electrical signal representative of the magnitude of the input DC current and for receiving the electrical signal representative of the output pressure and providing a control signal which is a function thereof;

output transducing means for providing the output pressure controlled by the control signal;

circuit means for receiving the electrical signal representative of the output pressure and providing a signal having a frequency representative of the output pressure; and interface means for receiving the signal having a frequency representative of the output pressure and non-interferingly superimposing a time varying signal having the frequency representative of the output pressure on the input DC current.

* * * * *